United States Patent
Li

(10) Patent No.: US 7,001,941 B2
(45) Date of Patent: Feb. 21, 2006

(54) ELASTOMERIC COMPOSITION AND PROCESS FOR PRODUCING GLOVE HAVING INTERPENETRATING NETWORK STRUCTURE

(75) Inventor: Rong-Shing Li, Tainan (TW)

(73) Assignee: Posaidon Enterprise Co., Ltd., Tainan (TW)

( * ) Notice: Subject to any disclaimer, the term of this patent is extended or adjusted under 35 U.S.C. 154(b) by 194 days.

(21) Appl. No.: 10/447,723

(22) Filed: May 29, 2003

(65) Prior Publication Data

US 2004/0214940 A1    Oct. 28, 2004

(30) Foreign Application Priority Data

Apr. 25, 2003  (TW) ................ 92109667 A

(51) Int. Cl.
| | |
|---|---|
| C08K 3/36 | (2006.01) |
| C08K 3/34 | (2006.01) |
| C08K 3/26 | (2006.01) |
| C08K 3/22 | (2006.01) |
| C08L 31/04 | (2006.01) |

(52) U.S. Cl. ............... 524/413; 524/426; 524/445; 524/447; 524/451; 524/501; 525/222
(58) Field of Classification Search ............ 525/222; 524/413, 426, 445, 447, 451, 501
See application file for complete search history.

(56) References Cited

U.S. PATENT DOCUMENTS

| | | | |
|---|---|---|---|
| 3,779,799 A | | 12/1973 | Kennedy et al. |
| 4,070,713 A | | 1/1978 | Stockum |
| 5,084,514 A | | 1/1992 | Szczechura et al. |
| 5,284,157 A | | 2/1994 | Miller et al. |
| 5,851,683 A | * | 12/1998 | Plamthottam et al. ...... 428/519 |
| 6,187,865 B1 | | 2/2001 | Brodeur, Jr. |
| 2002/0066529 A1 | * | 6/2002 | Tanno et al. ............. 158/309.3 |

FOREIGN PATENT DOCUMENTS

| | | |
|---|---|---|
| JP | 55-163202 | 12/1980 |
| JP | 5306383 | 11/1993 |
| JP | 7-506642 | 7/1995 |
| JP | 9-505612 | 6/1997 |
| WO | WO-20574 | 9/1994 |

OTHER PUBLICATIONS

USPTO obtained Derwent machine assisted translation of JP 5-306383-A (Nov. 19, 1993).*
USPTO obtained translation of JP 55-163202-A (Dec. 19, 1980).*

* cited by examiner

Primary Examiner—Matthew A. Thexton
(74) Attorney, Agent, or Firm—Madson & Metcalf

(57) ABSTRACT

An elastomeric composition includes a base latex and a thermoplastic ethylene-vinylacetate (EVA) copolymer latex. The base latex includes one or at least one of a styrene-butadiene rubber (SBR) latex and a carboxylated styrene-butadiene rubber (C-SBR) latex. A process for producing an elastomeric article having an interpenetrating network structure included the following steps. Firstly, a mold is contacted with such elastomeric composition. Then, the elastomeric composition on the mold is allowed to perform a vulcanization reaction, thereby forming the elastomeric article having the interpenetrating network structure.

11 Claims, No Drawings

ELASTOMERIC COMPOSITION AND PROCESS FOR PRODUCING GLOVE HAVING INTERPENETRATING NETWORK STRUCTURE

FIELD OF THE INVENTION

Preferably, the mixing ratio of the base latex to the EVA copolymer latex is from 95:5 to 40:60.

BACKGROUND OF THE INVENTION

A conventional glove is produced by blending PVC materials with plasticizers. When such glove is combusted, for example in the case of fire or being incinerated, the PVCs will be oxidized to generate corrosive gases and toxic gases such as dioxin, and the plasticizers will be oxidized to generate various contaminating substances. The corrosive gases are considered responsible for pulmonary edema when being inhaled and for serious damages of instruments in contact therewith. Dioxin and some of the contaminating substances might also cause the problems of environmental hormone and the like. In views of environmental protection, these conventional gloves have been eliminated through competition. Therefore, there is always a need to develop an improved glove so as to meet the requirement of environmental protection.

Although a glove made of natural rubber is known to be environmentally-friendly, the mechanical properties such as Young's modulus of the natural rubber glove are unsatisfactory. In addition, the natural rubber is disadvantageous to be a source of irritation such as skin itch, asthma and shock, etc.

JP 9-505612 (1997) described a glove manufactured by nitrile-rubber (NBR) latex. Although the NBR glove contains no known sources of irritation and has good resistance to chemical solvents, the commercial applications thereof are limited due to high manufacturing costs.

JP 55-163202 (1980) described a process for manufacturing a glove by using styrene-butadiene rubber (SBR). The SBR material is cost-effective. However, such glove has poor tensile stress and low tear strength, and the immersion molding effects of such glove are unsatisfactory.

JP 7-506642 (1995) described a process for manufacturing a glove by using thermoplastic butadiene-styrene-butadiene block polymers. Their commercial applications are limited due to the poor flexibility of such materials and complex processes for producing the gloves therefrom.

SUMMARY OF THE INVENTION

It is an object of the present invention to provide an elastomeric composition for producing an elastomeric article having an interpenetrating network structure so as to meet the requirement of environmental protection.

It is another object of the present invention to provide a cost-effective process for producing an elastomeric article from an elastomeric composition, which has an interpenetrating network structure.

In accordance with a first aspect of the present invention, there is provided an elastomeric composition for producing a glove. The elastomeric composition comprises a base latex comprising one or at least one of a styrene-butadiene rubber (SBR) latex and a carboxylated styrene-butadiene rubber (C-SBR) latex and a thermoplastic ethylene-vinylacetate (EVA) copolymer latex.

Preferably, the mixing ratio of the base latex to the EVA copolymer latex is from 99:1 to 5:95.

Preferably, the mixing ratio of the base latex to the EVA copolymer latex is from 99:5 to 40:60.

Preferably, the base latex comprises from 1% to 40% by mole of carboxylate group.

Preferably, the base latex comprises from 5% to 20% by mole of carboxylate group.

In an embodiment, the composition further comprises at least one additive selected from a group consisting of activators, vulcanization agents, vulcanization accelerators, anti-aging agents, enforcement agents, extenders and additional latices.

Preferably, the activator includes zinc oxides, in amount of from 1% to 10% by weight based on the total weight of the base latex and the EVA copolymer latex.

Preferably, the vulcanization agent includes sulfur, organic sulfide and a combination thereof, in amount of from 0.1% to 2% by weight based on the total weight of the base latex and the EVA copolymer latex.

Preferably, the vulcanization agent includes at least one selected from a group consisting of zinc N-ethyl-N-phenyldithiocarbamate, zinc dimethyldithiocarbamate, zinc diethyldithiocarbamate, zinc dibutyldithiocarbamate, zinc dibutyldithiocarbamate, zinc mercaptobenzothiazole, tetramethyl disulfide and a combination thereof, in amount of from 0.5% to 10% by weight based on the total weight of the base latex and the EVA copolymer latex.

Preferably, the anti-aging agent includes phenolic compounds or amine compounds, in amount of from 0.5% to 3% by weight based on the total weight of the base latex and the EVA copolymer latex.

Preferably, the enforcement agent includes at least one selected from a group consisting of nano-scale montmorillonite, mica, clay, bentonite, saponite, silica, titanium dioxide, potassium titanate whisker and a combination thereof, in amount of less than 20% by weight based on the total weight of the base latex and the EVA copolymer latex.

Preferably, the extender includes at least one selected from a group consisting of photocatalyst, talcum powder, calcium carbonate, titanium dioxide, antistatic agent, far infrared-ray emitting agent, pigment and a combination thereof, in amount of less than 20% by weight based on the total weight of the base latex and the EVA copolymer latex.

Preferably, the additional latices include aqueous polyurethane, aqueous nitrile rubber latex, acrylic resin latex and a combination thereof, in amount of less than 50% by weight based on the total weight of the base latex and the EVA copolymer latex.

In accordance with a second aspect of the present invention, there is provided an elastomeric composition. The elastomeric composition comprises 100 weight parts of a latex mixture, 1~10 weight parts of an activator, 0.1~2 weight parts of a vulcanization agent and 0.5~10 weight parts of a vulcanization accelerator. The latex mixture comprises a base latex and a thermoplastic ethylene-vinylacetate (EVA) copolymer latex. The base latex comprises a styrene-butadiene rubber (SBR) latex or a carboxylated styrene-butadiene rubber (C-SBR) latex or a mixture of SBR latex and C-SBR latex, wherein the mixing ratio of the base latex to the EVA copolymer latex is from 99:1 to 5:95.

In an embodiment, the composition further comprises 0.5~3 weight parts of an anti-aging agent, optionally an enforcement agent less than 20 weight parts, optionally an extender less than 20 weight parts and optionally additional latices less than 50 weight parts.

In accordance with a third aspect of the present invention, there is provided a process for producing an elastomeric article having an interpenetrating network structure. Firstly, a mold is contacted with an elastomeric composition comprising a base latex and a thermoplastic ethylene-vinylacetate (EVA) copolymer latex, wherein the base latex comprises a styrene-butadiene rubber (SBR) latex and/or a carboxylated styrene-butadiene rubber (C-SBR) latex. Then, the elastomeric composition on the mold is allowed to perform a vulcanization reaction, thereby forming the elastomeric article having the interpenetrating network structure.

In an embodiment, the process further comprises a step of immersing the mold into a solution of a coagulant selected from a group consisting of calcium nitrate, calcium chloride, alky ammonium and a combination thereof, before the step of contacting the mold with the elastomeric composition.

In an embodiment, the process further comprises a step of surface-treating the mold after the step of contacting the mold with the elastomeric composition and before the vulcanization reaction is performed.

In an embodiment, the step of surface-treating the mold is performed by using a surface-treating agent comprising 10~20% by weight of a synthesized resin, 10~20% by weight of an acrylic-styrene resin, 1~10% by weight of a silicon resin and the balance of water.

In an embodiment, the elastomeric article having the interpenetrating network structure is a glove.

The above objects and advantages of the present invention will become more readily apparent to those ordinarily skilled in the art after reviewing the following detailed description.

DETAILED DESCRIPTION OF THE PREFERRED EMBODIMENT

The objects of meeting the requirements of environmental protection and cost-effectiveness can be achieved by an elastomeric composition and a method of the present invention for producing an elastomeric article having an interpenetrating network structure.

The elastomeric composition of the present invention comprises a base latex and a thermoplastic ethylene-vinylacetate (EVA) copolymer latex. The base latex comprises at least one of a styrene-butadiene rubber (SBR) latex and a carboxylated styrene-butadiene rubber (C-SBR) latex. Some suitable additives, for example activators, vulcanization agents, vulcanization accelerators, anti-aging agents, enforcement agents, extenders and additional latices, can be combined into the elastomeric composition so as to impart desirable properties of the produced elastomeric articles. During a vulcanization process, the base latex and the EVA copolymer latex of the elastomeric composition are crosslinked to form the interpenetrating network structure of the elastomeric article having the interpenetrating network structure so as to impart excellent elastomeric properties such as elasticity and extensibility, as will be described hereinafter. More specifically, due to the excellent elasticity and extensibility, the elastomeric article produced from the elastomeric composition will generate different contractible degrees for the moving and motionless portions of the wearer. Thus, the wearer can feel the elastomeric article next to the skin.

The carboxylated styrene-butadiene rubber (C-SBR) latex is obtained by introducing carboxylate groups into the molecule chains of SBR. The base latex comprises preferably from 1% to 40%, and more preferably from 5% to 20% by mole of carboxylate groups. The presence of the C-SBR latex can provide good immersion molding effects of the produced elastomeric article and increase hydrogen-bond density of the SBR latex. The tensile stress and tear strength of the elastomeric article can be enhanced accordingly. The hydrogen bonding of C-SBR and/or SBR latex and EVA copolymer latex is increased during vulcanization so as to promote formation of the interpenetrating network structure. Furthermore, the EVA copolymer latex can also increase immersion molding effects of the produced elastomeric article, and thus provides good softness and touch feel.

The above-mentioned base latex can be used alone or in a mixture of at least two C-SBR lattices with different carboxylate groups. In addition, the combination of the SBR latex and the C-SBR latex can be used. The mixing ratio of the base latex to the EVA copolymer latex is preferably from 99:1 to 5:95, and more preferably from 95:5 to 40:60.

The activator used in the present invention may be zinc oxides, in amount of from 1% to 10% by weight based on the total weight of the base latex and the EVA copolymer latex.

The vulcanization agent includes for example sulfur, organic sulfide and a combination thereof, in amount of from 0.1% to 2% by weight based on the total weight of the base latex and the EVA copolymer latex.

The vulcanization agent is used to promote vulcanization reaction and can include for example zinc N-ethyl-N-phenyldithiocarbamate (PX), zinc dimethyldithiocarbamate (PZ), zinc diethyldithiocarbamate (EZ), zinc dibutyldithiocarbamate (BZ), zinc mercaptobenzothiazole (MZ), tetramethyl disulfide and a combination thereof, in amount of from 0.5% to 10% by weight based on the total weight of the base latex and the EVA copolymer latex.

The anti-aging agent may be phenolic compounds or amine compounds, in amount of from 0.5% to 3% by weight based on the total weight of the base latex and the EVA copolymer latex.

The enforcement agent used in the present invention includes for example nano-scale montmorillonite, mica, clay, bentonite, saponite, silica, titanium dioxide, potassium titanate whisker and a combination thereof, in amount of less than 20% by weight based on the total weight of the base latex and the EVA copolymer latex.

The extender used in the present invention includes for example photocatalyst, talcum powder, calcium carbonate, titanium dioxide, antistatic agent, far infrared-ray emitting agent, pigment and a combination thereof, in amount of less than 20% by weight based on the total weight of the base latex and the EVA copolymer latex.

The additional latices can include for example aqueous polyurethane, aqueous nitrile rubber (NBR) latex, acrylic resin latex and a combination thereof, in amount of less than 50% by weight based on the total weight of the base latex and the EVA copolymer latex.

The additives described hereinbefore can be incorporated into the elastomeric composition of the present invention in combination with a dispersing agent so as to increase dispersing effect thereof. Depending on the types of additives, such dispersing agents can be any suitable surfactant in amount of from 0.3% to 1% by weight based on the weight of the additive to be used.

A process for producing a glove will be described as follows. Firstly, a glove mold is immersed in a solution of a coagulant comprising calcium nitrate, calcium chloride, alky ammonium or a combination thereof. After the coagulant is precipitated from the solution, the glove mold is removed and dried. Then, the glove mold is immersed in an elastomeric composition of the present invention, removed and dried. Optionally, the glove mold is surface-treated by using a surface-treating agent comprising 10~20% by weight of a synthesized resin, 10~20% by weight of an acrylic-styrene resin, 1~10% by weight of a silicon resin and the balance of water. Then, the elastomeric composition on the surface-treated glove mold is vulcanized at a temperature between 90 and 180° C. for several minutes to several hundred minutes. After the vulcanized elastomeric composition is cooled and demolded, a glove having an interpenetrating network structure is formed.

The present invention will be further understood in more details with reference to the following examples.

EXAMPLE

Examples 1~4

Preparation of Elastomeric Composition

Four elastomeric compositions are prepared by the components indicated in Table 1 below, each component being represented by weight parts.

TABLE 1

| Component | Example # | | | |
|---|---|---|---|---|
|  | 1 | 2 | 3 | 4 |
| SBR | 100 | 0 | 40 | 50 |
| C-SBR* | 0 | 100 | 60 | 50 |
| EVA | 20 | 10 | 12 | 15 |
| Sulfur | 0.6 | 0.6 | 0.6 | 0.6 |
| Zinc oxide | 2 | 2 | 2 | 2 |
| PX** | 2 | 2 | 2 | 2 |
| nono-scale clay | 6 | 6 | 6 | 6 |
| aqueous nitrile rubber latex | 10 | 10 | 10 | 10 |
| water | 20 | 20 | 20 | 20 |

*comprising 10% by mole of carboxylate group
**zinc N-ethyl-N-phenyldithiocarbamate Preparation of Glove Four sets of glove molds are immersed in an aqueous solution containing 0.5~35% by weight of calcium nitrate. After calcium nitrate is precipitated from the solution, the glove mold is removed and dried. Then, the four sets of glove molds are immersed in the elastomeric compositions of the examples 1~4, respectively. Then, these glove molds are removed and dried. Optionally, the glove mold is surface-treated by using a surface-treating agent comprising 15% by weight of a synthesized resin, 15% by weight of an acrylic-styrene resin, 4% by weight of a silicon resin and 66% by weight of water. Then, the elastomeric composition on the surface-treated glove mold is vulcanized at a temperature of 150° C. for 15 minutes. After the vulcanized elastomeric compositions are cooled and demolded, gloves having interpenetrating network structures are formed.

Testing of Physical Properties

Table 2 shows the test results of physical properties of the gloves produced in the examples 1~4.

TABLE 2

| Physical properties | Example # | | | |
|---|---|---|---|---|
|  | 1 | 2 | 3 | 4 |
| Ultimate tensile stress (MPa) | 20.3 | 23.3 | 21.9 | 20.5 |
| Ultimate elongation (%) | 560 | 740 | 680 | 620 |
| Tensile stress @100% (MPa) | 1.03 | 1.18 | 1.10 | 1.06 |
| Tensile stress @200% (MPa) | 1.90 | 2.27 | 2.11 | 2.03 |
| Tensile stress @300% (MPa) | 2.87 | 3.38 | 3.22 | 3.12 |
| Tensile stress @400% (MPa) | 4.67 | 5.13 | 5.01 | 4.88 |
| Tensile stress @500% (MPa) | 5.77 | 7.70 | 7.12 | 6.99 |

The results of Table 2 show that the gloves produced by using the elastomeric compositions of the present invention have excellent tensile stress and elongation. Thus, good softness and touch feel can be provided to the wearer.

Combustion Test of Glove

The combustion tests of the above gloves are performed to measure acidity of the combusted gases and contents of dioxin.

The results of the combustion tests show that the acidities of the combusted gases have pH values between 4.0 and 4.6, and the contents of dioxin is approximately 0 ng/g. In contrast, the acidities of the combusted gases for a commercial PVC glove is about pH 2.0, and the contents of dioxin is about 25 ng/g.

The above results show the gloves produced by using the elastomeric compositions of the present invention have superior environmental protection effects.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. An elastomeric composition in the form of a glove, comprising:
    a base latex comprising a styrene-butadiene rubber (SBR) latex and a carboxylated styrene-butadiene rubber (C-SBR) latex; and
    a thermoplastic ethylene-vinylacetate (EVA) copolymer latex wherein the mixing ratio of said base latex to said EVA copolymer latex is from 95:5 to 40:60.

2. The composition according to claim 1 wherein said base latex comprises from 1% to 40% by mole of carboxylate group.

3. The composition according to claim 1 wherein said base latex comprises from 5% to 20% by mole of carboxylate group.

4. The composition according to claim 1 further comprising at least one additive selected from a group consisting of activators, vulcanization agents, vulcanization accelerators, anti-aging agents, enforcement agents, fillers and additional latices.

5. The composition according to claim 4 wherein said activator includes zinc oxides, in amount of from 1% to 10% by weight based on the total weight of said base latex and said EVA copolymer latex.

6. The composition according to claim 4 wherein said vulcanization agent includes sulfur, organic sulfide and a combination thereof, in amount of from 0.1% to 2% by weight based on the total weight of said base latex and said EVA copolymer latex.

7. The composition according to claim 4 wherein said vulcanization agent includes at least one selected from a group consisting of zinc N-ethyl-N-phenyldithiocarbamate, zinc dimethyldithiocarbamate, zinc diethyldithiocarbamate, zinc dibutyldithiocarbamate, zinc mercaptobenzothiazole, tetramethyl disulfide and a combination thereof, in amount of from 0.5% to 10% by weight based on the total weight of said base latex and said EVA copolymer latex.

8. The composition according to claim 4 wherein said anti-aging agent includes phenolic compounds or amine compounds, in amount of from 0.5% to 3% by weight based on the total weight of said base latex and said EVA copolymer latex.

9. The composition according to claim 4 wherein said enforcement agent is a nano-scale enforcement agent including at least one selected from a group consisting of montmorillonite, mica, clay, bentonite, saponite, silica, titanium dioxide, potassium titanate whisker and a combination thereof, in amount of less than 20% by weight based on the total weight of said base latex and said EVA copolymer latex.

10. The composition according to claim 4 wherein said additive includes at least one selected from a group consisting of photocatalyst, talcum powder, calcium carbonate, titanium dioxide, antistatic agent, far infrared-ray emitting agent, pigment and a combination thereof, in amount of less than 20% by weight based on the total weight of said base latex and said EVA copolymer latex.

11. The composition according to claim 4 wherein said additional latices include aqueous polyurethane, aqueous nitrile rubber latex, acrylic resin latex and a combination thereof, in amount of less than 50% by weight based on the total weight of said base latex and said EVA copolymer latex.

* * * * *

UNITED STATES PATENT AND TRADEMARK OFFICE
CERTIFICATE OF CORRECTION

PATENT NO. : 7,001,941 B2
APPLICATION NO. : 10/447723
DATED : February 21, 2006
INVENTOR(S) : Rong-Shing Li It is certified that error appears in the above-identified patent and that said Letters Patent is hereby corrected as shown below:

Column 1 please delete lines 8 through 9 and replace them with the following corrected paragraph --The present invention relates to an elastomeric composition for producing an elastomeric article, and more particularly to an elastomeric composition for producing an elastomeric article having an interpenetrating network structure. The present invention also relates to a method for producing such elastomeric article.--

Column 1 line 35 please delete "nitrile-rubber" and replace it with -- nitrile-butadiene rubber--.

Column 2 line 4 please delete "from 99:5 to 40:60" and replace it with -- from 95:5 to 40:60--.

Column 2 lines 24 through 25 please delete "diethyldithiocarbamate, zinc dibutyldithiocarbamate, zinc dibutyldithiocarbamate, zinc mercaptobenzothiazole," and replace it with -- diethyldithiocarbamate, zinc dibutyldithiocarbamate, zinc mercaptobenzothiazole,--.

Column 6 line 57 please delete "fillers" and replace it with --extenders--.

Column 8 line 5 please delete "additive includes" and replace it with --extender includes--.

Signed and Sealed this

Nineteenth Day of December, 2006

JON W. DUDAS
*Director of the United States Patent and Trademark Office*